Nov. 27, 1928.

H. D. STEVENS 1,693,531

CUTTING DEVICE

Filed April 22, 1924

Inventor
Horace D. Stevens

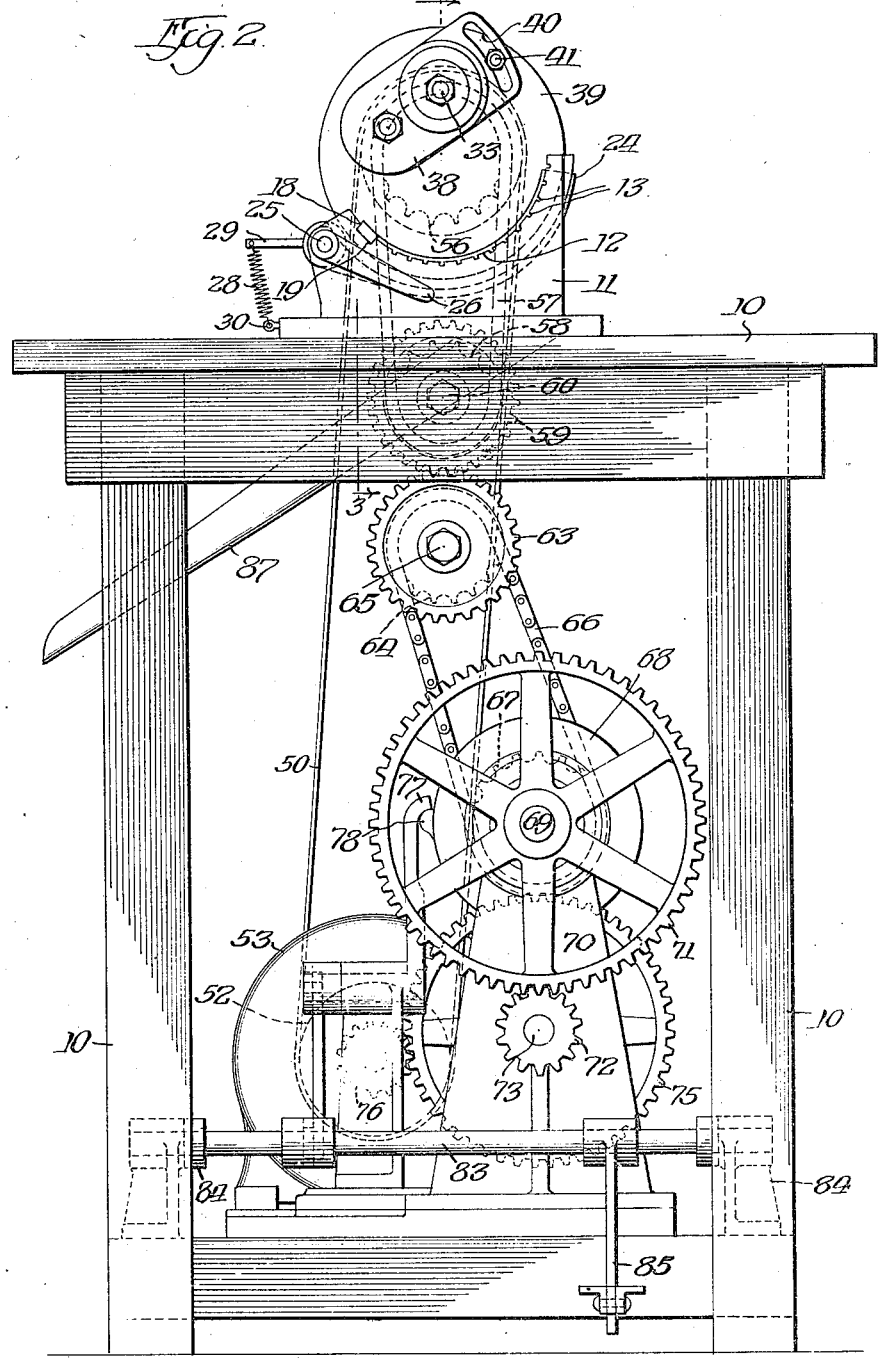

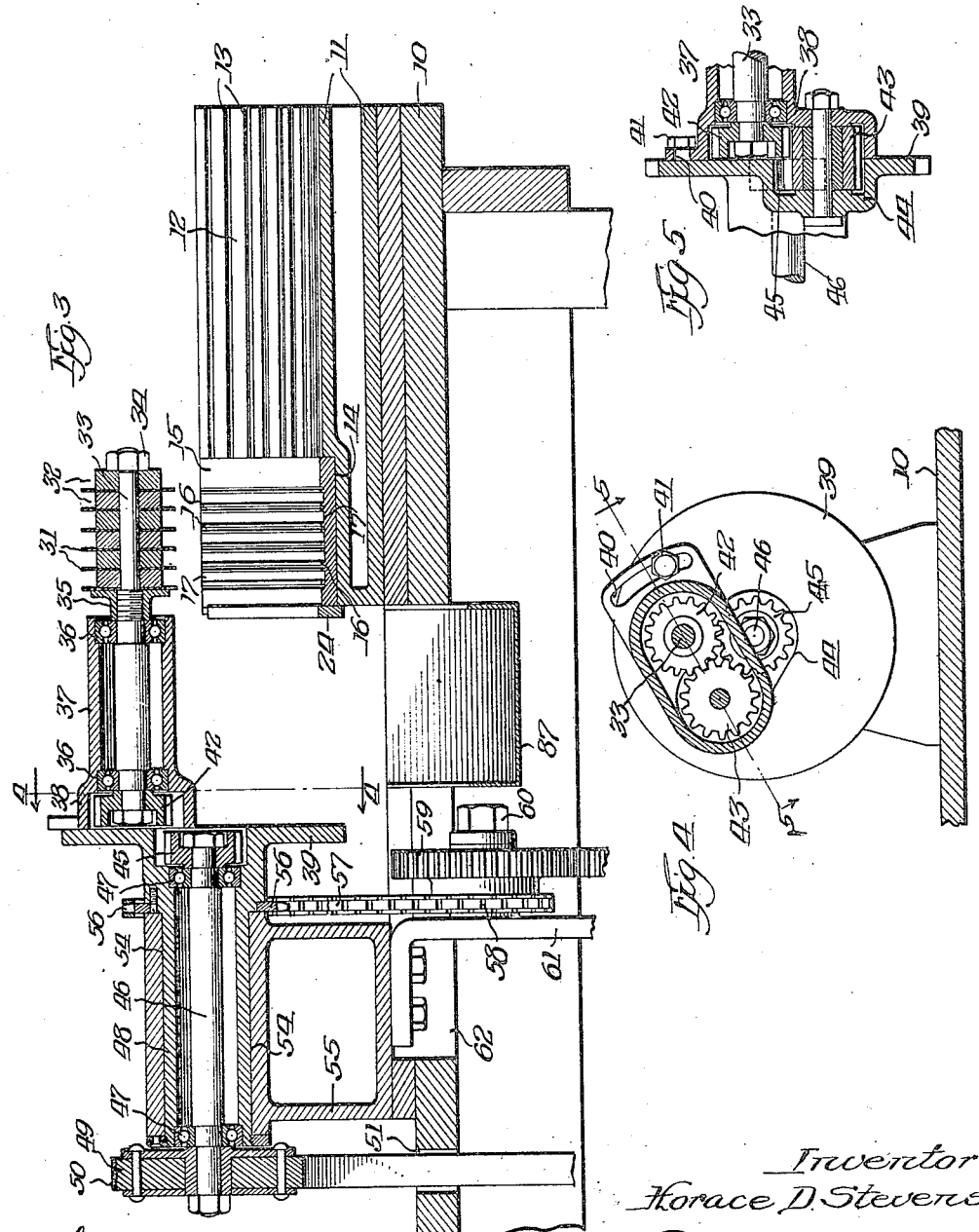

Nov. 27, 1928.

H. D. STEVENS

CUTTING DEVICE

Filed April 22, 1924  4 Sheets-Sheet 4

Witness:

Inventor
Horace D. Stevens,

Patented Nov. 27, 1928.

1,693,531

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

CUTTING DEVICE.

Application filed April 22, 1924. Serial No. 708,211.

This invention relates to cutters and particularly to rotary cutters adapted to cut flexible sheet material such as rubber into accurately-gaged strips for use as wind-shield wipers.

The purpose of the invention in general is to provide a simple and effective machine which is largely automatic and which is adapted accurately and rapidly to cut such strips from a sheet of rubber which may be fed thereto by hand or in any other suitable manner.

An important object of the invention is to provide an arc-shaped cutter block on which the sheet material may be supported substantially in cylindrical condition and to provide a revolving knife adapted to move over said arc-shaped cutter block. The knife preferably is rotary, hence an object of my invention is to provide means for rotating the knife while it is revolving, the means preferably being driven from the same source of power as the revolving means. In order that the knife shall not revolve during work-feeding operations, it is proposed to provide a means for imparting a single revolution to the knife and then automatically stopping the same while the knife is still rotating and to provide manual means for controlling the revolving of the knife.

Other objects of the invention are to provide means for guiding the stock onto the cutter block in substantially cylindrical condition, to provide means for positioning the stock thereon so that the strips will be accurately cut and to provide a movable stop gage adapted to engage the advancing end of the stock to position it on the cutter-block, said gage to be adapted to be movable out of the path of the advancing stock during a stock feeding operation so that previously cut strips may be pushed off the cutter block by the advance of the stock. Still other objects will appear in the following detailed description of the machine in connection with the accompanying drawings, it being understood that the description and drawings are for the purposes of illustrating the invention for the benefit of those skilled in the art and that the claims are not wholly limited to the specific structure shown and described.

Of the accompanying drawings:

Figure 2 is a front elevation thereof;

Figure 3 is an enlarged section on line 3—3 of Figure 2;

Figure 4 is a section on line 4—4 of Figure 3;

Figure 5 is a section on line 5—5 of Figure 4;

Figure 6 is a rear end elevation of a cutter block and its mount; and

Figure 7 is an enlarged section on line 7—7 of Figure 1.

Figure 1:
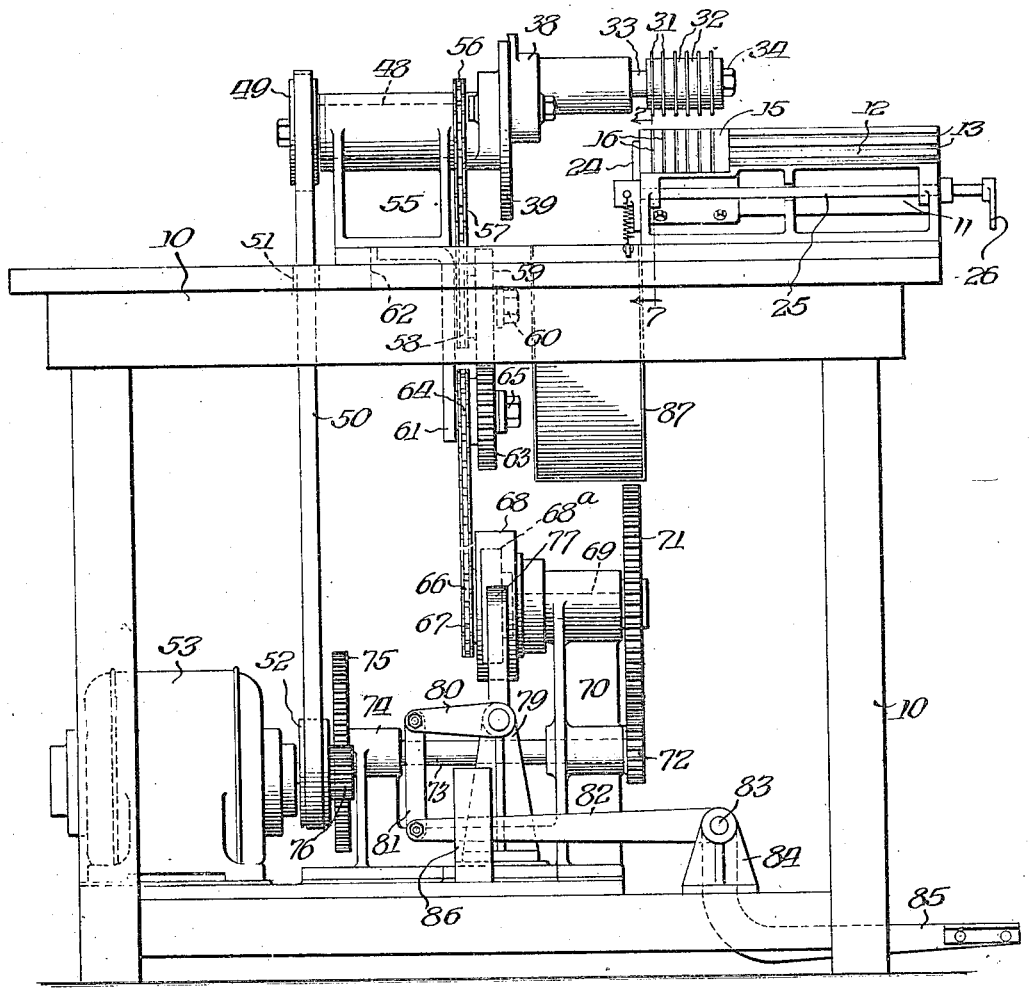
Figure 1 is a side elevation of a machine embodying the invention in its preferred form.

Referring to the drawings, 10 represents a table on which is mounted a combined cutter block mount and material-feeding support 11 having a concave, cylindrical upper surface 12 on which flexible sheeting such as rubber sheeting may be supported and advanced, longitudinal grooves 13, 13 being formed therein to prevent sticking of the sheeting due to suction. The surface 12 is so shaped that sheeting may be advanced thereover and fed in substantially cylindrical condition onto an arc-shaped cutter-block 15 seated in a depression 14 formed in the surface 12 adjacent the rear end of the cutter-block mount 11. The block 15 has formed therein transverse knife-receiving grooves 16, 16 of predetermined spacing depending upon the desired width of strips to be cut, it being understood that each of a number of interchangeable blocks 15 having grooves of various spacings may be suitably secured on the support 11. As shown in Figure 3, between grooves 16, other transverse grooves 17, 17 are provided, these grooves tending to prevent sticking of the stock on the cutter-block 15 as will be understood.

For guiding the stock onto the cutter-block in such manner as to assure accurate cutting, a guide plate 18 is provided (Fig. 2), a longitudinal groove 19 being formed in the support 11 for the reception of the plate which projects sufficiently from the groove to provide a stock-engaging edge.

For positioning the stock on the cutter-block 15, the plate 18 is formed with a portion 20 (Figures 5 and 6) suitably secured in a groove 21 in the block 15 as by screws indicated at 22, the portion 20 projecting above the groove and being transversely slotted or grooved as at 23, the groove 23 forming continuation of the grooves 16, to permit passage of knives through the grooves. Cooperating with the plate 18 to accurately position the stock on the block 15 is a pivoted arc-shaped gage bar 24 movable adjacent the rear end of the support 11. The bar 24 is secured on a shaft 25 journaled on the support 11 which shaft is adapted to be rocked manually by handle 26. The bar 24 is to be yieldingly urged against a projecting end of the plate 18 which acts as a stop therefor by engagement with a shoulder 27 on the bar so that the upper edge of the bar will project above the upper surface of the arc-shaped block 15 to engage the end of and to limit the advance of sheet material whereby it will be properly positioned over the groove 16. For this purpose a pull spring 28 is engaged with an arm 29 secured on the shaft 25, the spring 28 being secured in any suitable manner as by screw-eye 30 to the table 10.

The cutting mechanism comprises a series of rotary cutter discs 31, 31 spaced apart by spacers 32, 32 and secured on spindle 33 as by a nut 34 and end plate 35. The spacers 32, it will be understood, are interchangeable for use in cutting strips of varying widths and are adapted to space the knives so as to engage grooves 16 in cutter block 15. The spindle 33 is journaled on suitable ball-bearings 36, 36 in a sleeve 37 formed on an adjustable bracket 38 pivotally secured on a rotary head 39 at a point off from the center of said head, said bracket being adapted to be secured in various adjusted positions to vary the distance of the knives from the center of the head by a slot 40 therein through which passes a set screw 41 received in a threaded aperture in the head 39.

In order to drive the spindle 33 in all positions of adjustment of bracket 38 and while the head 39 is rotating, a pinion 42 is secured on the inner end of spindle 33 and meshes with a broad pinion 43 journaled on the pivot of bracket 38, as shown in Figure 5, the bracket being formed to house pinion 42 and half of broad pinion 43, the other half of pinion 43 being housed in a depression 44 formed about the pivot point of the bracket 38 in the head 39 and also about the center of the head so as to house a pinion 45 secured on a drive shaft 46 and meshing with the pinion 43. The drive shaft 46 is journaled on ball-bearings 47, 47 in a sleeve 48 formed on the head 39 whereby the shaft 46 is adapted to rotate independently of the sleeve 48. For driving shaft 46, a pulley 49 is secured on the end thereof projecting from said sleeve. A belt 50 is trained over the pulley and passes through a slot 51 in the table 10 and over a pulley 52 on the shaft of a motor 53. The sleeve 48 is journaled in a bearing 54 in a bracket 55 mounted on the table 10. For driving the sleeve 48 and consequently the head 39 independently of the shaft 46, a sprocket 56 is secured on the sleeve 48 and has trained thereover a chain 57, which is driven by a sprocket 58, journaled with a gear 59 on a stud 60 which is secured on a bracket member 61 secured to the lower surface of the bracket 55. A suitable opening 62 is provided in the table top to accommodate certain of the above-described elements as will be apparent from Figure 3. The gear 59 is meshed with a gear 63 which is similarly journaled with a sprocket 64 on a stud 65 also secured on the bracket member 61. The sprocket 64 has trained thereover a chain 66 which is trained over a drive sprocket 67.

As stated, it is desired to impart a single revolution to the cutters between each feeding operation. To this end, the drive sprocket 67 is secured to a casing 68 in which rotates a notched disk 68ᵃ of a suitable knock-out clutch. The disc is mounted on a shaft 69 journaled in a bracket 70 and driven by a gear 71, meshing with a gear 72 on a shaft 73. The shaft 73 is journaled in a bracket 70 and another bracket 74 and is driven by a gear 75 secured thereon and meshing with a gear 76 on the shaft of motor 53.

For manually controlling the revolution of the head 39 trip lever 77 (Fig. 2) formed with a hook-shaped end is adapted to engage the end of a knock-out clutch pawl indicated at 78 which is mounted on the clutch casing 68 and tends normally to engage the notched disc 68ᵃ to cause rotation of the head 39. The lever 77 is pivoted on a bracket 79 and is adapted to be moved sidewise out of engagement with the pawl 78 by an arm 80 secured thereto and connected by a link 81 to an arm 82 secured on a rock shaft 83 journaled in brackets 84, 84 and adapted to be rocked by pedal 85. A counter weight 86 is secured on arm 82 to normally hold the trip lever 77 in the path of the pawl 78 so that after the pedal 85 is depressed and released the weight 86 will urge the lever 77 back into the path of the pawl and prevent more than one revolution of the knives, such movement being limited by engagement of the weight with any suitable stop which may be, as shown, some portion of the table 10.

For conducting cut strips from the device, a suitable chute 87 may be arranged adjacent the support 11 under the opening 62 in the table.

In operation, a cutter-block 15 having grooves 16 of the desired spacing is mounted in the depression 14 in support 11 and the rotary knives 31 are secured with the corresponding spacers 32 on the spindle 33. The guide plate 18 having the correspondingly grooved portion 20 is secured in the grooves 19 and 21 and power is supplied to the motor 53 thus continuously rotating the knives as will be apparent and also continuously rotating shaft 69 on which is secured the notched disc 68ᵃ of clutch 68.

Sheet material, of such width as to produce the desired length of strip is now laid upon the surface 12 of support 11 and advanced onto the block 15, one edge of the sheet being engaged with the guide plate 18 and the advancing end thereof is butted against the gage bar 24. Pedal 85 is depressed and immediately released. Depression of the pedal releases the pawl 78 which rocks into engagement with a notch in the clutch disc 68ᵃ thus driving the casing 68 and the sprocket 67 whereby the head 39 will be revolved, as will be understood, such revolving motion being automatically stopped by engagement of the trip lever 79 with the pawl 78 the lever having returned to the position shown in Figure 1 as soon as the pedal was released.

After each cutting operation, as described above, the movable gage bar is swung downwardly by the workman who engages handle 26 for this purpose, thus permiting the operator to advance the sheet material onto the cutter block 15 this action pushing the cut strips from the block 15 into the chute. The sheet material is advanced sufficiently to push all the strips off of the block and is then drawn backwardly so that its edge will not be contacted by the gage bar 24 which is thereupon permitted to swing back into the position shown in Figure 6. The stock is again butted against the bar 24 and the cutting operations are repeated.

It has been found that rubber can be more accurately cut while in a cylindrical condition, preferably in trough shape, due to the fact that it does not tend to shift under the action of the knives. Rubber in flat condition cannot be cut as accurately due to the nature of the material it either shifts or buckles under the action of the knives. Action of a knife is so directed on the curved support that the greater part of the force of the knife cutting transversely across the rubber sheet is transmitted to the support so that there is no tendency toward shifting or buckling of the rubber. This action will be apparanet from the showing in Figure 7, wherein the arrow indicates the direction of the knife transversely of the rubber sheeting indicated by the letter R.

It will be seen from the foregoing that the invention provides a rapid and accurate semi-automatic machine for producing strips of flexible material. It will also be obvious that modifications of the invention may be resorted to without departing from the spirit or scope of the invention as claimed in the appended claims.

I claim:

1. A cutting device comprising an arc-shaped cutter block, a revolvable knife adapted to cut material supported on said block, means adapted to guide material onto said block, and means yieldingly urged upwardly so as to project above the surface of the block so as to be adapted to engage the advancing end of the material to gage the width of material to be cut, said means being adapted to be manually moved to or below the surface of the block for the purposes described.

2. A cutting device comprising means for holding a sheet of flexible material in cylindrical, trough-shaped condition and a cutter movable transversely of said sheet across the trough.

3. A cutting device comprising means for holding a sheet of flexible material in trough-shape and a cutter movable transversely of said sheet in the trough.

4. A cutting device comprising means for holding a sheet of flexible material in substantially a circular trough-shape and a revolvable cutter operable in a plane transversely of said sheet within the trough.

5. A cutting device comprising means for supporting a sheet of flexible material in cylindrical condition, means for engaging an edge thereof to prevent shifting of the sheet and a cutter movable transversely of said sheet within the trough toward said edge-engaging means.

6. A cutting device comprising means for supporting a sheet of flexible material in trough-shape, means adapted to engage an edge of the sheet to prevent shifting thereof and a cutter movable transversely of said sheet within the trough toward said edge-engaging means.

7. A device of the character described comprising means adapted to hold a sheet of flexible material in a cylindrical trough-shaped condition in which it is adapted to be transversely cut, and a cutter movable progressively through the sheet transversely within the trough.

8. A device of the character described comprising means adapted to support a sheet of vulcanized rubber in a trough-shape in which it is adapted to be trasversely cut, and means for progressively cutting the sheet transversely from within the trough.

9. That method of cutting vulcanized sheet rubber which comprises supporting it on a trough shaped backing, and cutting it progressively from one side to the other from within the trough.

10. That method of cutting flexible sheet material comprising supporting the material in cylindrical condition, and cutting the material transversely from within the cylinder defined thereby.

HORACE D. STEVENS.